United States Patent
Gilgen et al.

(10) Patent No.: US 7,707,464 B2
(45) Date of Patent: *Apr. 27, 2010

(54) TIMEOUT REQUEST SCHEDULING USING GROUPING AND NONSYNCHRONIZED PROCESSING TO ENHANCE PERFORMANCE

(75) Inventors: David Blair Gilgen, Raleigh, NC (US); William Daniel Wigger, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/353,743

(22) Filed: Jan. 14, 2009

(65) Prior Publication Data

US 2009/0132869 A1     May 21, 2009

Related U.S. Application Data

(63) Continuation of application No. 11/465,797, filed on Aug. 18, 2006, now Pat. No. 7,506,218.

(51) Int. Cl.
| | |
|---|---|
| G06F 11/00 | (2006.01) |
| G06F 3/00 | (2006.01) |
| G06F 13/00 | (2006.01) |
| G06F 5/00 | (2006.01) |
| G06F 13/24 | (2006.01) |

(52) U.S. Cl. .............. 714/55; 710/20; 710/32; 710/58; 710/260; 714/47; 714/48

(58) Field of Classification Search ....................... None
See application file for complete search history.

(56) References Cited

U.S. PATENT DOCUMENTS

| | | | | |
|---|---|---|---|---|
| 5,388,254 | A | * | 2/1995 | Betz et al. ................... 714/16 |
| 5,619,687 | A | * | 4/1997 | Langan et al. ............... 713/502 |
| 5,706,425 | A | * | 1/1998 | Unekawa ..................... 714/55 |
| 6,223,207 | B1 | * | 4/2001 | Lucovsky et al. ........... 718/107 |
| 6,446,225 | B1 | * | 9/2002 | Robsman et al. ............. 714/55 |
| 6,687,859 | B2 | * | 2/2004 | Robsman et al. ............. 714/55 |
| 6,950,869 | B2 | * | 9/2005 | Iizuka ......................... 709/224 |
| 7,206,953 | B1 | * | 4/2007 | Wilson ........................ 713/324 |
| 7,539,139 | B2 | * | 5/2009 | Rodrigo et al. ............. 370/235 |
| 2003/0074483 | A1 | * | 4/2003 | Minow ....................... 709/315 |
| 2006/0212607 | A1 | * | 9/2006 | Riethmuller .................. 710/6 |
| 2006/0242338 | A1 | * | 10/2006 | Kootstra et al. ............... 710/54 |

* cited by examiner

*Primary Examiner*—Tariq R. Hafiz
*Assistant Examiner*—Henry Yu
(74) *Attorney, Agent, or Firm*—Lee Law, PLLC; Christopher B. Lee

(57) ABSTRACT

An invention is disclosed for a computer software timeout algorithm that reduces the amount of list manipulation needed to satisfy system or network requirements for scheduling and cancelling timeout requests to determine whether the expiration time has been reached for execution of an input/output (I/O) request, thereby requiring action to cancel the I/O operation if it has not yet been completed.

14 Claims, 2 Drawing Sheets prior art (I/O) "event completion" model

I/O request 100 event completion notification 101

TIMEOUT REQUEST SCHEDULING USING GROUPING AND NONSYNCHRONIZED PROCESSING TO ENHANCE PERFORMANCE

RELATED APPLICATIONS

This application is a continuation of and claims priority to and claims the benefit of U.S. patent application Ser. No. 11/465,797 titled "TIMEOUT REQUEST SCHEDULING USING GROUPING AND NONSYNCHRONIZED PROCESSING TO ENHANCE PERFORMANCE," which was filed in the U.S. Patent and Trademark Office on Aug. 18, 2006, and which is incorporated herein by reference in its entirety.

TECHNICAL FIELD

This invention relates to use of "event completion" style input/output (I/O) models in computer system or network applications, and specifically to a computer software timeout algorithm that reduces the amount of list manipulation needed to satisfy system or network requirements for scheduling and cancelling timeout requests.

BACKGROUND

Input/Output ("I/O") operations encompass all types of actions and communications between a computer and its users and/or its processing, storage or peripheral devices, as well as with other system computers (via a network such as a local area network ("LAN") or a wide area network ("WAN") or the Internet using a communications protocol such as Transmission Control Protocol over Internet Protocol (TCP/IP)) or the outside world; including "read" operations (where information is extracted from a stored location in a system or network device) as well as "write" operations (where information is stored in a system or network location) and "transfer" operations (where information is transmitted from one system or network location or device to another). I/O "event completion" models are based upon use of application programming interfaces (APIs) that allow a software application to communicate with a computer or network operating system for the purpose of requesting performance of a particular I/O operation. When such I/O operations take place over a computer system or network, I/O "read" and/or "write" (or other) requests are made by a "user code" (or "thread") of the requesting application in order to send (or retrieve) data or instructions for the purpose of transmitting them from one system or network location or device to another.

System or network communication software often needs to provide "timeout" functionality for the reading and writing of data or instructions (and other I/O operations) in order to allow the next I/O request to be processed in the event that some system event or problem prevents processing of the current request. For example, a "read" I/O request will expire (or "timeout") within a certain period of time (often seconds) if the read operation has not been completed by that time after a "read" API has been called by the "user code" to execute that request. Most of the time such an I/O request will be completed within the required "timeout" period, and the "timeout" will not be signaled to the calling code for execution. However, problems can occur if the system or network is not optimized for performance in a way that prevents system processing resources from being unnecessarily used to schedule and cancel possible timeout actions. For example, if 10,000 "read" requests are initiated during a 5 second time interval and each of them has a timeout that is scheduled to occur within 60 to 120 seconds after initiation of the request, and each read is subsequently executed within 30 seconds after its initiation, then the system resources that were used to schedule (and subsequently cancel) those "timeout requests" were wasted by being occupied with those requests instead of contributing to system processing activity (or "through-put").

Most system or network "timeout" algorithms involve keeping track of when outstanding I/O requests will "timeout" through use of a list that is periodically checked (for example once per second) to determine whether the timeout (expiration) time has been reached for a given request, and if so a "timeout action" is taken to cancel the associated I/O operation. The list is then accessed to remove a "timeout entry" when its I/O operation has been timely completed so that it will not be errantly triggered. However, the processing of such "timeout lists" causes a significant degradation in system performance, since the list must be ordered according to the point in time when an entry will timeout due to expiration of its I/O request, requiring the list to be searched for the proper location to insert a new entry (as well as for removal of an entry when it is no longer needed due to timely execution of the request). Such a list must also be periodically processed to find any "active" entry requiring a "timeout action" to be taken due to expiration of its I/O operation without completion. Software synchronization logic is required to coordinate the timing of most of these types of "list manipulation actions" with a further resulting degradation in system processing performance.

SUMMARY OF THE INVENTION

An invention is disclosed for a computer software "timeout algorithm" program that reduces the amount of "timeout list" manipulation needed to satisfy system or network requirements for scheduling and cancelling "timeout requests" to determine whether the "timeout period" (or expiration time) has been reached for execution of an input/output (I/O) request, thereby requiring a "timeout action" to cancel the I/O operation if it has not yet been completed.

Specifically, the "timeout algorithm" is comprised of software components programmed to execute at least the following functions:

(a). A timeout action is not scheduled to be taken at the exact time when it should occur for each I/O operation to be executed by the system or network, but is instead adjusted to take place at the nearest interval or increment after that time (such as by "rounding up" to the nearest second) in order to allow individual timeout request entries to be chronologically grouped into a subset (or "timeout bucket") of all entries having the same adjusted timeout time, so as to allow processing of the timeout list to be accomplished through use of the buckets instead of individual entries by comparison of the system chronological time to the timeout time for each bucket. If the timeout time has been passed then a timeout action is initiated for an entry if it has not already been cancelled due to timely completion of its associated I/O request.

(b). Individual timeout entries are not removed from a bucket when the corresponding I/O operation is timely completed. Instead each timeout entry has a data field (or "timeout status flag") that can be set to schedule (and subsequently reset to cancel) a pending timeout action, in order to eliminate the need for removal of an entry from a timeout list after its associated I/O request has been timely executed.

(c). An individual timeout entry is initially stored in an unordered list (or "queue") before being placed into a timeout bucket ordered according to its adjusted timeout time to be processed by the timeout algorithm. This queue is made up of those timeout entries associated with the most recent I/O requests, and is used by the algorithm code segment (or "thread") which processes the information contained in a timeout list consisting of the set of "active" timeout buckets. This thread is programmed to be "lazy" (i.e., is inactive or "sleeps" periodically) so that it does not process entries in the queue as quickly as possible but instead allows it to be frequently updated by other threads, in order to enable a timeout request in the queue to be "self-cancelled" before being placed into a timeout bucket (and therefore quickly discarded without action) if its associated I/O request is timely executed before the queue entry is next processed.

(d). Each timeout bucket is "pruned" (i.e., examined periodically) to determine whether all of its individual timeout entries have been cancelled, thereby allowing the bucket to be discarded. The timeout algorithm is deactivated for a certain period of time (i.e., "sleeps for a lazy interval") to allow data processing to be accomplished instead of timeout processing.

It is therefore an object of the present invention to overcome the disadvantages of the prior art by providing improved use of event completion style input/output (I/O) models in computer system or network applications, through disclosure of a computer software timeout algorithm program that reduces the amount of timeout list manipulation needed to satisfy system or network requirements for scheduling and cancelling timeout requests to determine whether the timeout period (or expiration time) has been reached for execution of an input/output (I/O) request, thereby requiring a timeout action to cancel the I/O operation if it has not yet been completed.

It is another object of the present invention to overcome the disadvantages of the prior art by providing a timeout algorithm comprised of software components programmed to execute a timeout action that is adjusted to take place at the nearest time interval after the exact time when it should occur for each I/O operation to be executed by the system or network, in order to allow individual timeout request entries to be chronologically grouped into a subset (or "timeout bucket") of all entries having the same adjusted timeout time, so as to allow processing of the timeout list to be accomplished through use of the buckets instead of individual entries by comparison of the system time to the timeout time for each bucket, such that if the timeout time has been passed then a timeout action is initiated for an entry if it has not already been cancelled due to timely completion of its associated I/O request.

It is another object of the present invention to overcome the disadvantages of the prior art by providing a timeout algorithm comprised of software components programmed to process individual timeout entries each having a data field (or "timeout status flag") that can be set to schedule (and subsequently reset to cancel) a pending timeout action, in order to eliminate the need for removal of an entry from a timeout list after its associated I/O request has been timely executed.

It is another object of the present invention to overcome the disadvantages of the prior art by providing a timeout algorithm comprised of software components programmed to process an individual timeout entry that is initially stored in an unordered list (or "queue") before being placed into a timeout bucket to be processed by the timeout algorithm, wherein the queue is used by the algorithm code segment which processes the information contained in a timeout list and is programmed to enable a timeout request in the queue to be cancelled and discarded without action before being placed into a timeout bucket.

It is another object of the present invention to overcome the disadvantages of the prior art by providing a timeout algorithm comprised of software components programmed to inactivate the algorithm for a period of time to allow data processing to be accomplished instead of timeout processing.

It is another object of the present invention to overcome the disadvantages of the prior art by providing a timeout algorithm comprised of software components programmed to examine each timeout bucket periodically to determine whether all of its individual timeout entries have been cancelled.

The subject matter which is regarded as the invention is particularly pointed out and distinctly claimed in the concluding portion of the specification. The invention, however, together with further objects and advantages thereof, may best be understood by reference to the following description taken in conjunction with the accompanying drawings.

BRIEF DESCRIPTION OF THE DETAILED DRAWINGS

DETAILED DESCRIPTION OF THE PREFERRED EMBODIMENTS

Figure 1:
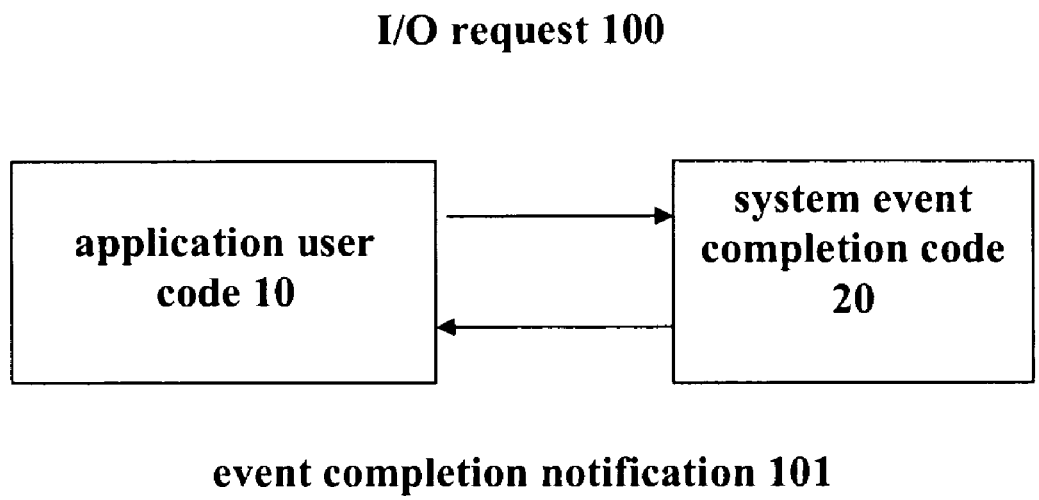
FIG. 1 is a diagram illustrating a prior art "event completion" style input/output (I/O) model.

As illustrated in FIG. 1, input/output (I/O) "event completion" models are based upon use of application programming interfaces (APIs) that allow a software application to communicate with a computer operating system for the purpose of requesting performance of a particular I/O operation 100. When such I/O operations take place over a computer system or network, I/O "read" or "write" (or other) requests are made by a "user code" segment (or "thread") of the requesting application 10 sending such a request to an "event completion code" module 20 for the purpose of transmitting data or instructions from one system or network location or device to another. The event completion code then responds by providing notification of completion 101 to the user code after the I/O request has been successfully processed.

Figure 2:
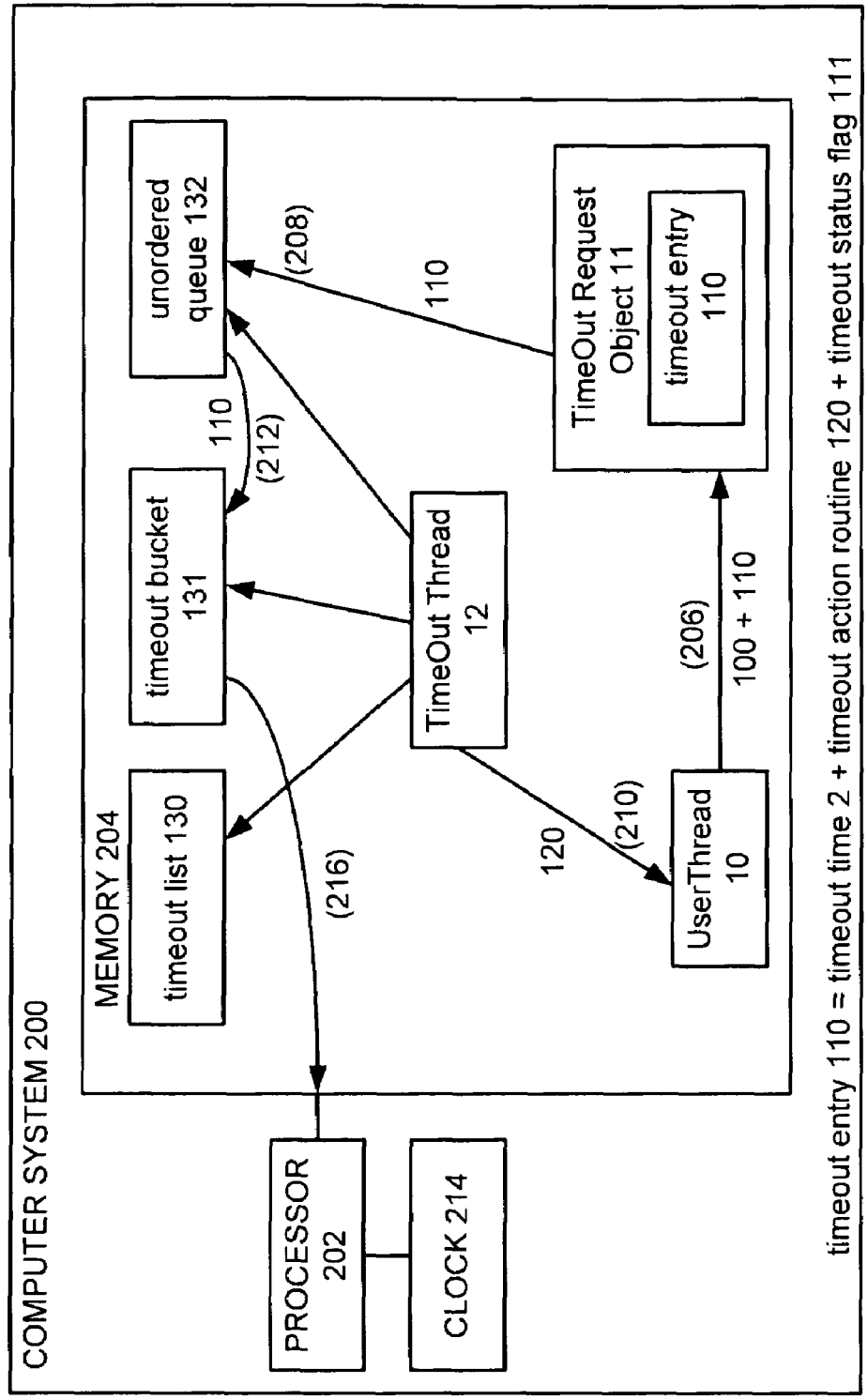
FIG. 2 is a diagram illustrating the components of a timeout algorithm comprised of software components programmed to execute a timeout action according to a preferred embodiment of the invention.

This invention discloses a computer software "timeout algorithm" program 1 that reduces the amount of "timeout list" 130 manipulation (and therefore processing resources) needed to satisfy computer system 200 or network requirements for scheduling and cancelling "timeout requests" 110 to determine whether the "timeout" (or expiration) time has been reached for execution of an input/output (I/O) request 100, thereby requiring a "timeout action" 120 to cancel the I/O operation if it has not yet been completed. As illustrated in FIG. 2, the timeout algorithm program is preferably comprised of software components executed by a processor 202 from a memory 204 consisting of many TimeOutRequest objects 11 along with many UserThreads 10 and a TimeOutThread 12 all programmed using conventional techniques to execute at least the functions described herein.

A UserThread 10 is programmed to be executed by the processor 202 to accomplish the following processing functions: (i) a TimeOutRequest object 11 is created when a "timeout entry" 110 is originated upon initiation of an I/O request 100 (event 206) and then placed into an "unordered queue" 132 event 208 with its "timeout status flag" 111 set to ACTIVE for a pending I/O request; (ii) a TimeOutRequest object is then invalidated by resetting its timeout status flag to CANCELLED when a timeout entry is no longer needed because its associated I/O request has been timely completed or if its timeout period has expired and a timeout action has been invoked.

A TimeOutRequest object 11 consists of definition of at least the following data fields for each individual timeout entry 110: (i) a timeout time 2 for which the timeout action will be invoked to cancel the read/write (or other) I/O operation 100 if it has not been completed by then (which can be the same length or duration for multiple timeout entries); (ii) identifying a "timeout action callback routine" should execution of a timeout action 120 (event 210) be required for that entry; and (iii) setting a timeout status flag 111 as ACTIVE for an individual timeout request 110 if its associated I/O request 100 has not yet been executed and its timeout time 2 has not yet been reached, or CANCELLED if a timeout request is no longer valid due to timely completion of its I/O request or expiration of its timeout period and the subsequent invocation of a timeout action.

A TimeOutThread 12 processes the "timeout buckets" 131 and timeout lists 130 (including the unordered queue 132) and is programmed to be executed by the processor 202 to accomplish the following processing functions, in order to eliminate the need for these data structures to be protected by "synchronization logic" since they will be accessed by only this thread: (i) an individual TimeOutRequest object 11 is removed from the unordered queue and it is ignored if this timeout request 110 has already been cancelled, and this processing step is then revisited for the next TimeOutRequest object in the queue; otherwise (ii) the point in time is calculated when that request should signal a timeout action 120 by adding the unelapsed portion of the timeout period 2 for that request to the initiation time of its associated I/O request 100 (which can be the current chronological time) and then adjusting the timeout action to take place at the nearest time interval or increment after that time (such as by "rounding up" to the nearest second or multiple of 1024).

The list of timeout buckets 131 is then searched for one that has the same adjusted timeout time 2 as the timeout request 110 under examination from the unordered queue 132, and if one is found then the request is inserted into that bucket from the unordered queue (event 212); otherwise, a new bucket is created with this new timeout time and the timeout request is assigned to that bucket (which can hold either a fixed or varying number of entries). The list of timeout buckets is ordered from "lowest" (soonest upcoming) timeout time to "highest" (most distant future) timeout time, so that a new bucket is inserted at that point in the list after a bucket that has a lower (and before a bucket that has a higher) timeout time than its own, so that each bucket represents the correct point in time for occurrence of the timeout with respect to each timeout request in that bucket. This processing step is then revisited for the next TimeOutRequest object 11 in the queue, and if there are no more timeout requests stored in the queue then the next processing step is executed.

The current chronological clock 214 time is determined by the processor 202 from the computer system 200 and each timeout bucket 131 is periodically retrieved for examination (event 216) according to its order from "lowest" timeout time to "highest" timeout time. The system chronological time is then compared to the timeout time 2 for the next bucket. If the timeout time has been passed then each timeout entry in the bucket is examined, and the TimeOutThread 12 triggers the timeout callback routine to initiate a timeout action 120 (event 210) for the entry if it has not already been cancelled due to timely completion of its associated I/O request 100. (It should be noted that the timeout callback routine must in some instances be synchronized with the timeout status flag 111 to ensure that the I/O operation is not being completed at essentially the same time when the "timeout" is detected.) The timeout bucket 131 is then discarded after examining each of its timeout entries in this manner. Once a bucket is encountered for which the timeout time has not been reached, then no more buckets are examined through that cycle because each subsequent bucket will also have a timeout time that has not been reached. Therefore the next processing step will be executed. The "pruning" processing step is then executed after the last timeout bucket is examined using this step.

A "dead bucket pruning time interval" is defined to determine how often each—timeout bucket list 131 should be examined to decide if a bucket can be discarded. If this time interval has been triggered then each bucket is examined to determine whether all of its timeout entries 110 have been invalidated. If at least one timeout entry is still ACTIVE then the next bucket is examined, since all entries have not yet "timed out" for that bucket (meaning that it cannot yet be discarded). If all entries in a timeout bucket have already been invalidated, then its entries are discarded and the bucket is eliminated. The timeout algorithm 1 is inactivated for a certain period of time (i.e., "sleeps for a lazy interval") to allow data processing to be accomplished instead of timeout processing. The timeout algorithm is then repeated in its entirety after expiration of this "lazy sleep interval" time period.

While certain preferred features of the invention have been shown by way of illustration, many modifications and changes can be made that fall within the true spirit of the invention as embodied in the following claims, which are to be interpreted as broadly as the law permits to cover the full scope of the invention, including all equivalents thereto.

What is claimed is:

1. A computer program product comprising a computer readable storage medium including a computer readable program, wherein the computer readable program when executed on a computer causes the computer to:

execute one or more user segments programmed to:
create at least one timeout request object when a timeout request is originated upon initiation of an associated input/output (I/O) operation;
define a timeout time period for completion of the I/O operation associated with that at least one timeout request object;
store the at least one timeout request object into a queue associated with a first memory location with a timeout status indicator set to schedule a pending cancellation action for the I/O operation; and
invalidate the timeout request object by resetting the timeout status indicator if the I/O operation is completed prior to expiration of the timeout period or if the timeout period has expired and a timeout action has been invoked; and execute a timeout processing segment programmed to:
examine the queue comprised of one or more timeout request objects;
ignore an invalidated timeout request object;
calculate, for a timeout request object that has not been invalidated, a point in time when a timeout action is required to cancel an incomplete I/O operation by adding an unelapsed portion of the timeout time period to an initiation time of the I/O operation and adjust an expiration time for the associated I/O operation to take place at a nearest time period interval after that time, this being a new adjusted expiration time;

move the timeout request object that has not been invalidated to a grouped timeout list selected from a plurality of grouped timeout lists in a second memory location, the grouped timeout list comprising storage for at least one additional timeout request object with the same adjusted expiration time; and examine the grouped timeout list for expiration of the associated I/O operations.

2. The computer program product of claim 1 wherein the computer readable program when executed on the computer causes the computer to execute a timeout algorithm programmed to process the timeout request to determine the expiration time for execution of the I/O operation and to cancel an incomplete I/O operation upon expiration.

3. The computer program product of claim 1 wherein the computer readable program when executed on the computer causes the computer to:

define at least the following data fields for the at least one timeout request object:

identification of a program for execution of a timeout action to cancel the I/O operation upon expiration of the timeout period; and identification of the timeout status indicator to determine whether the I/O operation is completed prior to expiration of the timeout period.

4. The computer program product of claim 1 wherein the computer readable program when executed on the computer causes the computer to process the grouped timeout list by comparison of a system chronological time to the adjusted expiration time for each timeout request object so as to initiate action to cancel the incomplete I/O operation when the adjusted expiration time has passed.

5. The computer program product of claim 1 wherein the computer readable program when executed on the computer causes the computer to process the queue to enable at least one of the one or more invalidated timeout request objects to be discarded without action before being placed into the grouped timeout list.

6. The computer program product of claim 1 wherein the computer readable program when executed on the computer causes the computer to deactivate the timeout algorithm for a period of time to allow other data processing to be accomplished.

7. The computer program product of claim 1 wherein the computer readable program when executed on the computer causes the computer to examine the grouped timeout list periodically to determine whether the timeout request objects have been invalidated.

8. A method of using a computer system or network, comprising:

executing one or more user segments programmed to accomplish at least the following functions:

creating at least one timeout request object when a timeout request is originated upon initiation of an associated input/output (I/O) operation;

defining a timeout time period for completion of the I/O operation associated with that at least one timeout request object;

storing the at least one timeout request object into a queue associated with a first memory location with a timeout status indicator set to schedule a pending cancellation action for the I/O operation; and invalidating the timeout request object by resetting the timeout status indicator if the I/O operation is completed prior to expiration of the timeout period or if the timeout period has expired and a timeout action has been invoked; and executing a timeout processing segment programmed to accomplish at least the following functions:

examining the queue comprised of one or more timeout request objects;

ignoring an invalidated timeout request object;

calculating, for a timeout request object that has not been invalidated, a point in time when a timeout action is required to cancel an incomplete I/O operation by adding an unelapsed portion of the timeout time period to an initiation time of the I/O operation and adjusting an expiration time for the associated I/O operation to take place at a nearest time period interval after that time, this being a new adjusted expiration time;

moving the timeout request object that has not been invalidated to a grouped timeout list in a second memory location, the grouped timeout list comprising storage for at least one additional timeout request object with the same adjusted expiration time; and examining the grouped timeout list for expiration of the associated I/O operations.

9. The method of claim 8 further comprising executing a timeout algorithm programmed to process the timeout request to determine the expiration time for execution the I/O operations and to cancel an incomplete operation upon expiration.

10. The method of claim 8 further comprising:

defining at least the following data fields for the at least one timeout request object:

identification of a program for execution of a timeout action to cancel the I/O operation upon expiration of the timeout period; and identification of the timeout status indicator to determine whether the I/O operation is completed prior to expiration of the timeout period.

11. The method of claim 8 further comprising processing the queue by comparison of a system chronological time to the adjusted expiration time for each timeout request object so as to initiate action to cancel the incomplete I/O operation when the adjusted expiration time has been passed.

12. The method of claim 8 further comprising processing the queue to enable at least one of the one or more invalidated timeout request objects to be discarded without action before being placed into the grouped timeout list.

13. The method of claim 8 further comprising deactivating the timeout algorithm for a period of time to allow other data processing to be accomplished.

14. The method of claim 8 further comprising examining periodically the grouped timeout list to determine whether the timeout request objects have been invalidated.

* * * * *